L. H. PARCHER.
SPRING SHACKLE.
APPLICATION FILED FEB. 24, 1920.
1,426,406.
Patented Aug. 22, 1922.
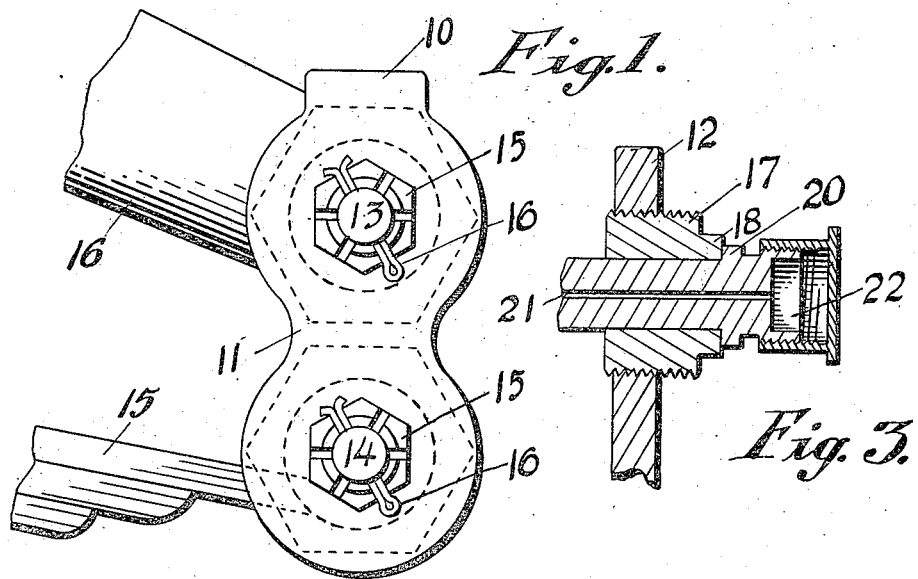
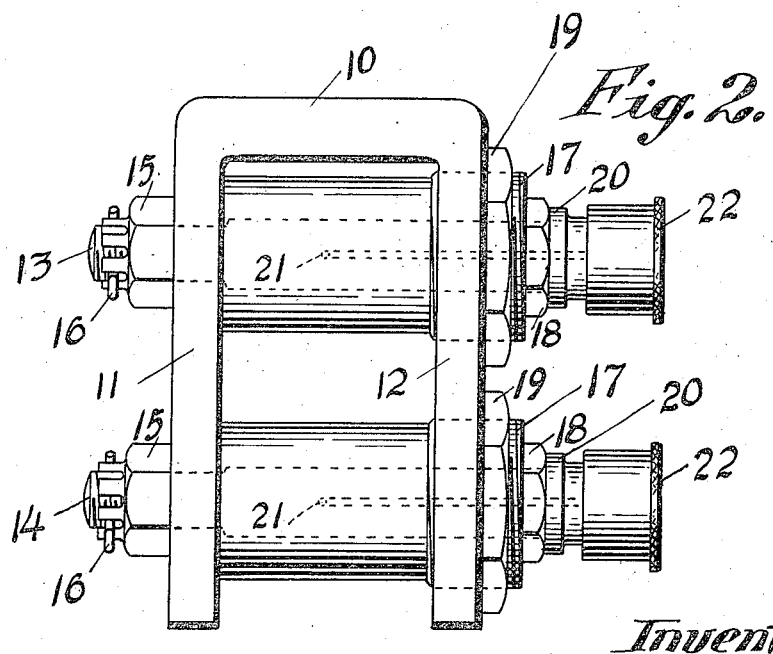
Inventor:
Lucian Herbert Parcher.
By Attorneys.
Southgate & Southgate

UNITED STATES PATENT OFFICE.

LUCIAN HERBERT PARCHER, OF GARDNER, MASSACHUSETTS.

SPRING SHACKLE.

1,426,406.  Specification of Letters Patent.  Patented Aug. 22, 1922.

Application filed February 24, 1920. Serial No. 360,944.

*To all whom it may concern:*

Be it known that I, LUCIAN HERBERT PARCHER, a citizen of the United States, residing at Gardner, in the county of Worcester and State of Massachusetts, have invented a new and useful Spring Shackle, of which the following is a specification.

This invention relates to a spring shackle of the type commonly used for securing the supporting springs of an automobile to each other or to the frame thereof.

In a new car the springs fit closely in the spring shackles and no side play is permitted. After a few months' operation, however, the parts frequently wear so that more or less side play is present. A little side play in the spring shackles produces a surprising amount of noise when the car is in operation and is a defect frequently annoying and not easily located or remedied.

It is the object of my invention to provide convenient means for taking up such side play in the springs and for closely adjusting the spring shackles thereto.

My invention further relates to arrangements and combinations of parts hereinafter described and more particularly pointed out in the appended claim. A preferred form of my invention is shown in the drawings, in which—

Fig. 1 is a side elevation of my improved shackle;

Fig. 2 is an end elevation thereof; and

Fig. 3 is a detail sectional view taken along the axis of one of the connecting studs.

Referring to the drawings, I have shown a shackle comprising a U-shaped frame 10, having side portions 11 and 12 rigidly held in spaced relation. Studs 13 and 14 extend through the side members 11 and 12 and support springs 15 or a frame member 16, as the case may be.

At their left hand ends, as viewed in Fig. 2, the studs 13 and 14 extend freely through openings in the frame member 11 and are secured by nuts 15 and locking devices 16.

Bushings 17 (Fig. 3) are threaded in the side member 12 of the frame 10 and are provided with extensions 18 to which a wrench may be applied. Lock nuts 19 are provided to secure the bushings 17 in adjusted position in the side member 12. A flange 20 may be provided on each stud 13 or 14 to engage the outer end of its bushing 17 and each stud may be provided with a grease passage 21 and the usual grease cup 22.

If the parts become worn, so that side play of the springs occurs, it is merely necessary to loosen the lock nuts 19 and to adjust the bushings 17 to take up the side play, after which the lock nuts may be again tightened. In this way, a close fit and quiet operation of the springs may be at all times secured.

Having thus described my invention, it will be evident that changes and modifications can be made therein by those skilled in the art within the spirit and scope of my invention as set forth in the claim, and I do not wish to be otherwise limited to the details herein disclosed, but what I claim is:—

A spring shackle comprising side members rigidly spaced apart, a bushing threaded in one side member, means to lock said bushing in position, a spring supporting stud extending through said bushing and having a shoulder engaging the outer end thereof, said stud also fitting an opening in the opposite side member of said shackle, and means to draw said shoulder against said bushing and to preserve the longitudinal adjustment of said stud.

In testimony whereof I have hereunto affixed my signature.

LUCIAN HERBERT PARCHER.